(12) United States Patent
Moato et al.

(10) Patent No.: US 10,277,748 B2
(45) Date of Patent: Apr. 30, 2019

(54) AD-HOC COMMUNICATION NETWORK AND COMMUNICATION METHOD

(71) Applicant: CARDO SYSTEMS, INC., Pittsburgh, PA (US)

(72) Inventors: Abraham Avi Moato, Rishon Le'Zion (IL); Abraham Glezerman, Tel Aviv (IL); Albert Samuel Ashkenazy, Herzliya (IL); Yael Sherman, Ramat Gan (IL); Yossef Rahamim, Tel Aviv (IL)

(73) Assignee: Cardo Systems, Inc., Pittsburgh, PA (US)

( * ) Notice: Subject to any disclaimer, the term of this patent is extended or adjusted under 35 U.S.C. 154(b) by 91 days.

(21) Appl. No.: 15/514,010

(22) PCT Filed: Sep. 24, 2015

(86) PCT No.: PCT/IL2015/050971
§ 371 (c)(1),
(2) Date: Mar. 24, 2017

(87) PCT Pub. No.: WO2016/051405
PCT Pub. Date: Apr. 7, 2016

(65) Prior Publication Data
US 2017/0244838 A1    Aug. 24, 2017

(30) Foreign Application Priority Data

Sep. 29, 2014 (IL) .......................................... 234888
Nov. 6, 2014 (IL) .......................................... 235552

(51) Int. Cl.
*H04W 8/26* (2009.01)
*H04M 3/56* (2006.01)
(Continued)

(52) U.S. Cl.
CPC ............ *H04M 3/561* (2013.01); *H04J 3/0652* (2013.01); *H04L 41/12* (2013.01); *H04M 3/568* (2013.01);
(Continued)

(58) Field of Classification Search
CPC ..... H04W 72/10; H04W 84/18; H04W 40/22; H04W 40/24; H04W 40/242;
(Continued)

(56) References Cited

U.S. PATENT DOCUMENTS 6,028,853 A * 2/2000 Haartsen ............... H04B 7/2687
370/338
7,266,104 B2 * 9/2007 Belcea .................. H04W 40/08
370/338
(Continued)

FOREIGN PATENT DOCUMENTS

JP    2004312060    11/2004
JP    2008211790    9/2008

OTHER PUBLICATIONS

European Search Report filed in EP 15 84 7894 dated Apr. 20, 2018.
(Continued)

*Primary Examiner* — Jung Liu
(74) *Attorney, Agent, or Firm* — Rankin, Hill & Clark LLP

(57) ABSTRACT

The present invention relates to a method for forming a mobile ad-hoc voice network for operation in a rapidly changing environment, which comprises (A) assigning to a plurality of devices a group ID and to each of said devices a respective serial number (B) providing within each of said devices an algorithm for (B.1) calculating, based on individual neighbors data that are transmitted by each of the network devices within slots of a TDMA cycle, a structure of the network, including determination of one or more relay (Continued)

devices (B.2) calculating a leader for the network and (B.3) calculating a synchronizer for the network (C) transmitting by each of said devices within slots of said TDMA cycle the respective neighbors of that device (D) transmitting by the synchronizer of said network periodical synchronization data within slots of the TDMA cycle, and propagating the synchronization data to all the network devices upon, completion of each of said TDMA cycle, applying said algorithm by each of said devices to determine and possibly update the structure of the network, the relays of the network, and the leader of said network (E) within a period of said TDMA cycle, synchronizing each of the devices based on said synchronization data, while upon determination that the synchronizer is missing, determining by each device a new synchronizer for the system and (F) sending by devices of said network within a plurality of said TDMA slots voice data in digital form.

18 Claims, 4 Drawing Sheets

(51) Int. Cl.
```
    H04W 8/18      (2009.01)
    H04W 84/20     (2009.01)
    H04J 3/06      (2006.01)
    H04L 12/24     (2006.01)
    H04W 56/00     (2009.01)
    H04W 72/04     (2009.01)
```
(52) U.S. Cl.
 CPC ............ *H04W 8/186* (2013.01); *H04W 8/26* (2013.01); *H04W 56/0015* (2013.01); *H04W 72/0446* (2013.01); *H04W 84/20* (2013.01)

(58) Field of Classification Search
 CPC ... H04W 40/248; H04W 50/46; H04W 88/04; H04B 7/2687; H04B 7/269; H04B 7/2696; H04J 3/06; H04J 3/12; H04J 7/212; H04J 7/26
 See application file for complete search history.

(56) References Cited

U.S. PATENT DOCUMENTS

| | | | | |
|---|---|---|---|---|
| 9,312,977 | B1* | 4/2016 | Khuu | H04J 3/1694 |
| 2002/0018448 | A1* | 2/2002 | Amis | H04L 29/12254 |
| | | | | 370/255 |
| 2003/0096576 | A1* | 5/2003 | Salonidis | H04W 48/16 |
| | | | | 455/41.1 |
| 2003/0151513 | A1* | 8/2003 | Herrmann | G08B 25/003 |
| | | | | 340/573.1 |
| 2006/0198324 | A1* | 9/2006 | Nerses | H04B 7/155 |
| | | | | 370/260 |
| 2006/0198346 | A1* | 9/2006 | Liu | H04W 40/24 |
| | | | | 370/338 |
| 2006/0268745 | A1* | 11/2006 | Hur | H04W 40/10 |
| | | | | 370/254 |
| 2010/0189082 | A1* | 7/2010 | Choi | H04W 64/00 |
| | | | | 370/336 |
| 2012/0039308 | A1* | 2/2012 | Kim | H04W 8/005 |
| | | | | 370/336 |
| 2012/0127977 | A1* | 5/2012 | Copeland | H04L 1/0015 |
| | | | | 370/338 |
| 2012/0155441 | A1* | 6/2012 | Rousseau | H04W 72/10 |
| | | | | 370/337 |
| 2013/0301471 | A1* | 11/2013 | Brown | H04W 40/248 |
| | | | | 370/254 |
| 2013/0301633 | A1* | 11/2013 | Brown | H04J 3/0647 |
| | | | | 370/350 |
| 2014/0105205 | A1* | 4/2014 | Honig | H04B 7/2643 |
| | | | | 370/350 |

OTHER PUBLICATIONS

International Search Report filed in PCT/IL2015/050971 dated Jan. 14, 2016.

* cited by examiner

FRAME 1

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| S | D | D | D | 14 | D | D | D | 13 | D | D | D | 12 | D | D | D | D | 11 | D | D |

FRAME 1 (CONTINUE)

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| D | 10 | D | D | D | 9 | D | D | D | 8 | D | D | D | 7 | D | D | D | D | D | 6 |

FRAME 2

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| S | D | D | D | 5 | D | D | D | 4 | D | D | D | 3 | D | D | D | D | 2 | D | D |

FRAME 2 (CONTINUED)

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| D | 1 | D | D | D | 0 | D | D | D | R | D | D | D | R | D | D | D | D | D | R |

FRAME 3

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| S | D | D | R | D | D | D | R | D | D | D | R | D | D | D | D | R | D | D | D |

FRAME 3 (CONTINUED)

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| D | R | D | D | R | D | D | D | R | D | D | D | R | D | D | D | D | D | D | R |

FRAME 4

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| S | D | D | R | D | D | D | R | D | D | D | R | D | D | D | D | R | D | D | D |

FRAME 4 (CONTINUED)

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| D | R | D | D | R | D | D | D | R | D | D | D | R | D | D | D | D | D | D | R |

FIG. 3

FRAME 5

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| S | D |   |   | R |   |   | D | R |   |    | R  |    | D  |    |    | R  |    |    |    |

FRAME 5 (CONTINUED)

| 20 | 21 | 22 | 23 | 24 | 25 | 26 | 27 | 28 | 29 | 30 | 31 | 32 | 33 | 34 | 35 | 36 | 37 | 38 | 39 |
|----|----|----|----|----|----|----|----|----|----|----|----|----|----|----|----|----|----|----|----|
| D  | L  |    |    |    | L  |    | D  |    |    | L  |    |    | D  | L  |    |    |    |    | L  |

FIG. 3 (Continued)

AD-HOC COMMUNICATION NETWORK AND COMMUNICATION METHOD

FIELD OF THE INVENTION

The present invention relates in general to the field of mobile communication. More particularly, the invention pertains to a mobile ad-hoc communication network that enables its participants to transmit full-duplex sound and data while operating in a rapidly changing environment.

BACKGROUND OF THE INVENTION

Mobile Ad-Hoc Networks (MANET) are well known and widely used for communication. A MANET is used, for example, by home security forces, the military, sensor networks, etc. Naturally, such ad-hoc networks are designed to support joining of multiple mobile devices to form a communication network, and to ensure a proper operation of the network when one or more of the "member" devices leave the network, for example, when exceeding the effective range with respect to one or more of other network devices. Some of said MANET networks are designed to allow sound communications between the member devices.

US 2008/0268855 discusses dynamic allocation of bandwidth by a "master" device to "router stations" (routers), following receipt from said routers of bandwidth requirement information, respectively.

While ad-hoc networks of the prior art typically include adaptations to structural variations in the network due to joining, separation, or changes in locations of the each specific mobile device within the network, still those structural variations in said prior art networks occur relatively slow, typically in the range of one variation every several minutes or more. Furthermore, the MANET systems of the prior art typically support a half-duplex sound communication (i.e., "walkie talkie" type of communication), not a full duplex, or conference type of sound communication in which two or more users (for example, four) can conduct a simultaneous discussion. It should be noted that achieving such type of communications in a seamless manner requires resolving significant complications, in view of propagation delays of the sound signals to all the network devices, and in view of processing times within the devices.

For example, the ad-hoc sound communication networks of the prior art are not suitable for conducting full duplex, conference type of discussion by a plurality of motorcyclists or mobile devices users. More specifically, in the motorcycle environment, there is a necessity for an ad-hoc, full duplex sound communication network which enables a plurality of motorcyclists (for example up to 10 motorcyclists) to participate in a simultaneous "conference call", in which any of the riders can talk and randomly upper limit of 4 of them can be heard at all times by all of the other motorcyclists who participate in the conference call, or join the conference call at will. The fact that motorcycles move in high speeds such as 150 kilometers per hour or more and randomly change their respective positions in the group results in frequent network structural variations, i.e., variations in a rate which cannot be handled by prior art ad-hoc sound networks. Moreover, these frequent variations in the network structure add still another significant difficulty to said need for supporting full-duplex, even conference type of sound communication between the various devices.

Still another necessity which may exist, for example, in the motorcyclist or mobile devices environment is to allow additional participants that are external of the MANET system to join the conference call. For example, upon establishment of a MANET conference call between 4 motorcyclists, a fifth participant which is external of the MANET, but having a telephone mobile communication (or any other communication) with one of the MANET participants may wish to participate in the conference discussion. Such an option has never been provided by the prior art. This necessity may also exist for professional users e.g. enterprise and public safety users that move in areas where communication infrastructure coverage is partial or may be damaged, requiring continuation of the mobile communication, using off-network MANET. Such group of users is also very dynamic and requires full duplex conference call.

It is therefore an object of the present invention to provide an ad-hoc sound communication system which can handle significant and frequent structural variations that may occur in rates of seconds, while still providing a full duplex, conference type of communication between several member devices.

It is another object of the present invention to optionally include a hopping type of sound communication between devices of said ad-hoc network, and to handle structural variations in said hopping structure.

It is still another object of the present invention to provide an easy and simple procedure for configuring the devices that join the network.

It is still another object of the present invention to account for a loss of communication with ad-hoc key devices, such as "leader", relays or "synchronize" respectively, while enabling prompt recovery and proper operation of the network even following said loss of communication with said key devices.

It is still another object of the present invention to easily and dynamically enable modifications in the structure of the network.

It is still another object of the invention to enable connectivity between two or more types of networks, one of them is a MANET network and the other is, for example, a packet switching (LAN/WAN) network or a circuit switching (cellular) network, by using of one or more of the MANET participant devices to establish said multi-network connectivity.

It is still an object of the present invention to provide said ad-hoc sound or data communication system which is suitable, among others, for motorcyclists use.

Other objects and advantages of the present invention will become apparent as the description proceeds.

SUMMARY OF THE INVENTION

The present invention relates to a method for forming a mobile ad-hoc voice network for operation in a rapidly changing environment, which comprises: (A) assigning to a plurality of devices a group ID and to each of said devices a respective serial number; (B) providing within each of said devices an algorithm for: (B.1) calculating, based on individual neighbors data that are transmitted by each of the network devices within slots of a TDMA cycle, a structure of the network, including determination of one or more relay devices; (B.2) calculating a leader for the network; and (B.3) calculating a synchronizer for the network; (C) transmitting by each of said devices within slots of said TDMA cycle the respective neighbors of that device; (D) transmitting by the synchronizer of said network periodical synchronization data within slots of the TDMA cycle, and propagating the synchronization data to all the network devices; upon completion of each of said TDMA cycle, applying said algorithm by each of said devices to determine and possibly update the structure of the network, the relays of the network, and the leader of said network; (E) within a period of said TDMA cycle, synchronizing each of the devices based on said synchronization data, while upon determination that the synchronizer is missing, determining by each device a new synchronizer for the system; and (F) sending by devices of said network within a plurality of said TDMA slots voice data in digital form.

Preferably, the cycle duration is between 90 ms to 2 seconds.

Preferably, the voice data which is introduced to within said slots is voice data which is compressed within the respective device by a vocoder, while voice data is introduced simultaneously by any of up to 4 devices to within respective of said TDMA slots.

Preferably, said decoder within each device decodes and sounds the compressed voice data via respective speakers.

Preferably, the voice data is propagated by said TDMA slots to all the devices within the network, possibly by one or more of the relay devices respectively.

Preferably, said neighbors data is propagated within said TDMA cycle within predefined control slots and within relay slots respectively.

Preferably, said synchronization data from the synchronizer is conveyed within predefined synchronization slots within a dedicated slot of a respective frame.

Preferably, upon determination of a missing synchronizer, each device determines a new synchronizer while the newly determined synchronizer is the one having the highest serial number from among the remaining devices.

Preferably, an additional fine tuning synchronization is provided by each respective device at each control slot at the TDMA cycle, while devices of the network use said additional synchronization data to fine tune their own synchronization.

Preferably, said leader is determined to be the device which is at the center of the network and is therefore used to optimally propagate network architecture and collision resolution.

Preferably, when two or more devices are determined to be equally qualified for serving as a leader, the one meeting a predefined criterion among them is selected to serve as the leader.

Preferably, said criterion is the device having the largest serial number among those that are found to be equally qualified for serving as a leader.

Preferably, the method of the invention is used within a mobile ad-hoc voice network for motorcyclists or mobile devices, wherein each device further comprises a voice activation detector, for determining voice initiation by the user.

Preferably, the method further comprises the providing of a head device for assigning a group ID and device serial number to each device.

Preferably, one or more of the participant deices in said ad-hoc voice network uses a LAN/WAN/Cellular module to interconnect between devices within said ad-hoc network and remote devices of an external network.

Preferably, said one or more devices that use their LAN/WAN/Cellular for the purpose of said interconnection are assigned manually to perform this task.

Preferably, said one or more devices that use their LAN/WAN/Cellular for the purpose of said interconnection are assigned automatically and dynamically to perform this task during the operation of said ad-hoc network.

Preferably, a device may be used as a router to interconnect the MA ET to LAN/WAN (packet switching network) or circuit switching cellular network. A device may become an interconnection router if the user chooses to add a remote party to the conference or by automatic method based on thresholds set.

BRIEF DESCRIPTION OF THE DRAWINGS

In the drawings:

FIG. 3 illustrates an example of TDMA cycle for operation with the mobile ad hoc voice communication network of the invention.

DETAILED DESCRIPTION OF PREFERRED EMBODIMENTS

As noted above, the present invention provides an efficient conference, full duplex sound MANET which efficiently operates within a rapidly changing environment that affects the structure of the network both in terms of the physical location of the network member devices, and in terms of the relative locations between said member devices.

As will become apparent, the full-duplex sound MANET of the invention comprises a plurality of devices, several of them operate as a combined transceiver-relay device, and others operate as transceivers only (i.e., a device which transmits or receives packets). The function of each of said devices may vary dynamically, such that a transceiver may become a transceiver-relay, or vice versa, a transceiver-relay may become a transceiver only. When operating as a relay, a leapfrogging effect is achieved and the reach of the sending device is being extended by way of letting its messages "hop" through a transceiver-relay, to a second transceiver, which in itself may function either as a relay or a regular transceiver may occur. Hopping will thus serve as a means to generally extend the communication reach of the entire group. The MANET of the invention operates in a TDMA protocol.

Figure 1:
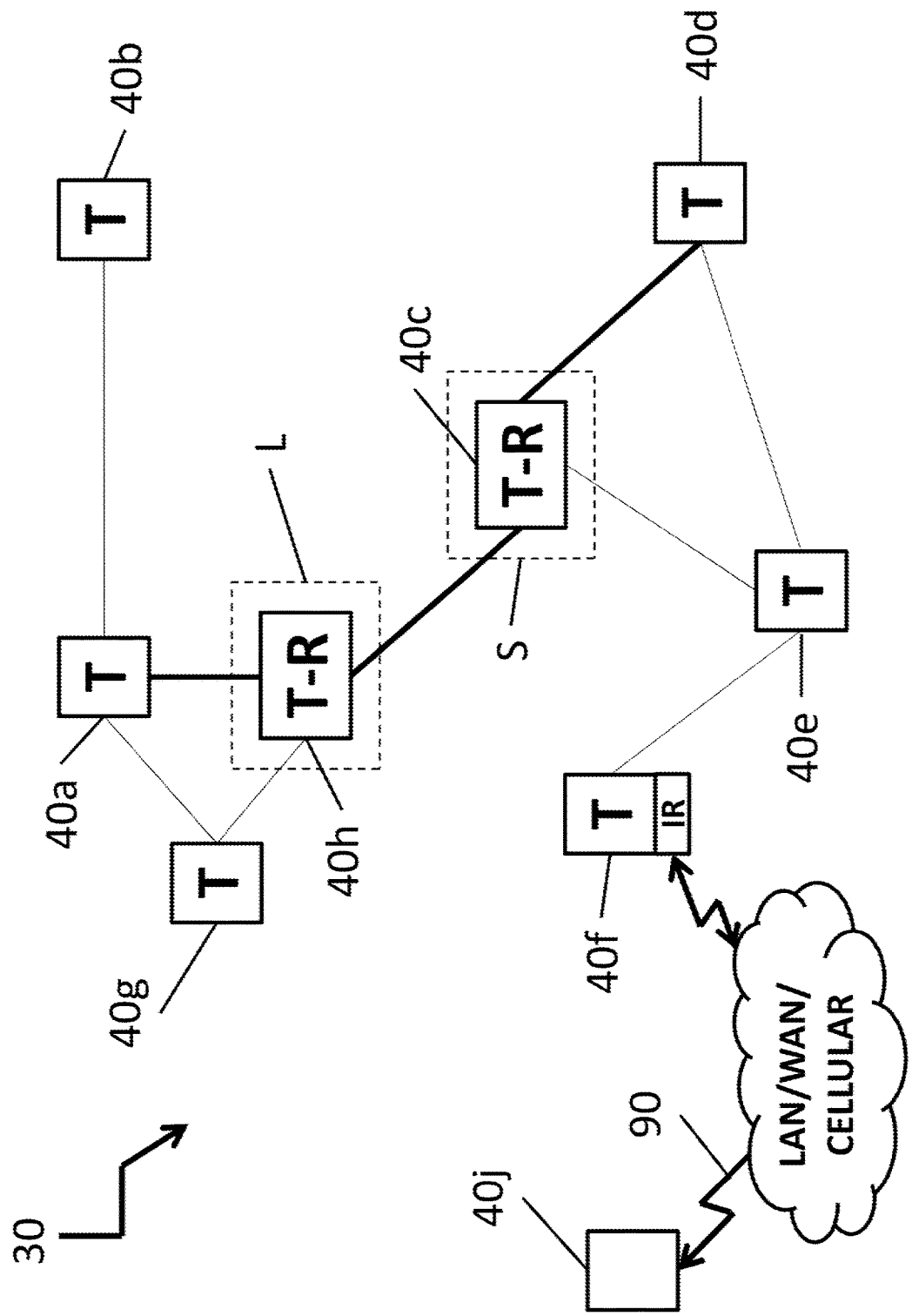
FIG. 1 illustrates a temporary structure of the mobile ad hoc voice communication network according to an embodiment of the invention.

FIG. 1 illustrates a temporary structure of a MANET 30 according to an embodiment of the preset invention. This exemplary MANET comprises of eight communication devices 40a-40g, while six of them are regular transceivers (indicated by T), and two others (devices 40c and 40h) operate as transceivers-relays (indicated by T-R). In order to assure communication to an extended range, hopping manner of propagation of messages is used in several of the devices. For example, voice from device 40a may be conveyed in a TDMA manner to device 40d (which is out of the range for device 40a) via two T-Rs 40h and 40c. Device 40h may convey a message to device 40g directly, but to device 40e via T-R 40c, which means that device 40c receives a message from device 40h in slot x and re-sends the message in slot x+i, in which device 40e receives it.

The system of FIG. 1 may optionally enable interconnection to an external device (for example, a cellular phone), allowing it to join a conference discussion which takes place over the MANET. For enabling this option, device 40f serves in FIG. 1 as Interconnection Router (IR) to LAN/WAN/Circuit switching cellular network. When device 40f receives a message from device 40e, it retransmits it to the remote (for example, cellular) network 90, and remote device 40*j*. When it receives an input from the device 40*j* via the remote network 90, it retransmits it to the MANET, optionally mixing it with its own input.

As will also be elaborated later, at any given time the MANET of the invention also comprises a leader device L, and a synchronizer device S (in some cases a same device may function as both synchronizer and leader). It should be noted that FIG. 1 illustrates a temporary situation, as, for example, the relative locations of the devices may rapidly change—in case of using them by motorcycle riders, the locations may significantly change within a matter of few seconds or even portions of seconds.

The following description combines general parameters, as well as specific parameters of a preferred embodiment. More specifically, for the sake of convenience, and to provide easier appreciation of the invention, this preferred embodiment includes indications of specific parameters (such as number of member devices, duration of each TDMA cycle, number of possible message hopings, maximal range, etc.). However, it should be noted that the invention is not limited to any of said specific parameters.

Figure 2:
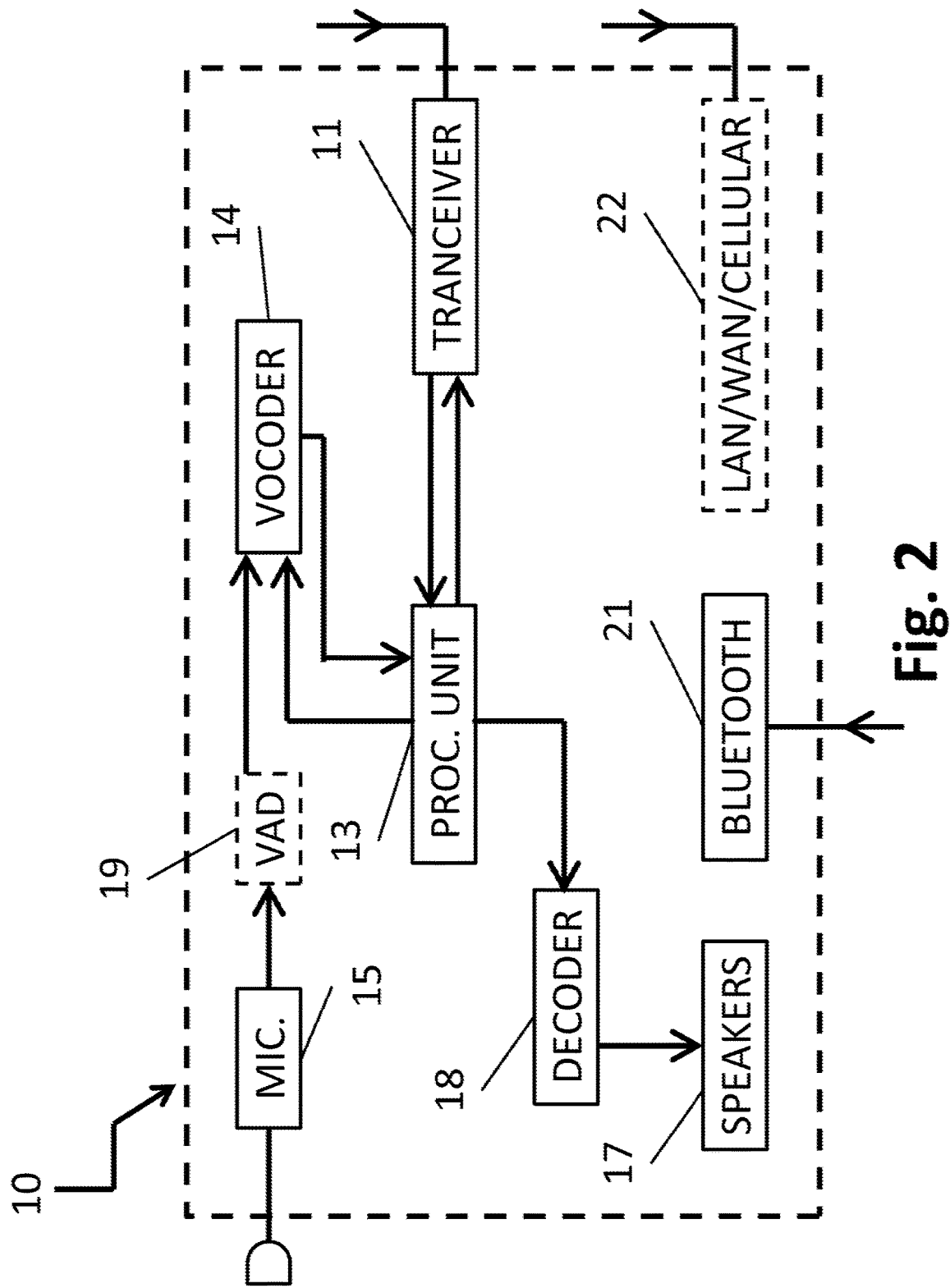
FIG. 2 discloses a basic structure of a MANET device, according to an embodiment of the invention.

FIG. 2 discloses a basic structure of a MANET device 10, according to one embodiment of the invention. Device 10 comprises a transceiver 11, a processing unit 13, vocoder 14, decoder 18, optional voice activation detector (VAD) 19, microphone 15, and speakers 17. Preferably, device 10 also comprises a Bluetooth unit 21 which may be used, for enabling hands free use, carry out the grouping stage and interconnection with an external network as disclosed hereinafter. The device 10 may also comprise a LAN/WAN/Circuit switching Cellular module 22 for enabling interconnection with said external network as disclosed hereinafter.

The MANET is initialized by a grouping stage among the participants. The grouping stage begins by defining one of the devices as a "head" device. Next, the head device assigns a group ID and a serial number to each of the member devices. For example, the head device and each of the devices that are planned to form the network are switched to a "grouping state". The devices are then brought (either jointly, or sequentially) to close physical proximity (such as 3 meters) with the head device. The head device, preferably by using the Bluetooth unit 21, in turn assigns a group ID and a device serial number for example, from 1 to 15 (or less, in case of fewer devices) to each of the devices respectively, while the head device is assigned with the same group ID and serial number 0. The group ID is used for distinguishing each group from others that may operate in the vicinity, without which an undesired intermingling of such groups may occur. Each of the devices preferably provides an indication for the completion of this stage. Preferably, there is a limit for the number of possible devices within the group, such that when a device tries to join a group in which this limit has been reached, such an attempt will be rejected by the head device until a slot is vacated by an active member. Furthermore, when a device who has previously abandoned the group attempts to rejoin a group, the attempting device is preferably assigned with a same previous serial number, if said serial number is still available. In an embodiment of the invention, only the head device can form a group and can assign serial numbers to the group devices, and only the head device can add devices to an existing group. However, and unlike other existing technologies, the subject MANET of the invention makes it possible for the group to function even when the head device disappears from the group at a later stage, or when the group data is deleted from the head device. In such a case of an absent of the head device, any addition of a member device to the group may require deletion of the previous grouping data from all the group devices, and forming a new group in the manner as described above will be required. It should be noted that preferably any device may become a head device for grouping the network by an easy Man Machine Interface such as, button pressing.

In one embodiment, each device stores its grouping data with respect to a single group. In another embodiment, the device may store grouping data for more than one group, however, at any given time only one grouping data should be activated within the device.

The grouping stage may alternatively be performed by means of a computer or a mobile phone. In one embodiment, each device may maintain several alternative sets of grouping data in a computer or a mobile device, and only a single selected grouping data may be downloaded to the device.

The communication between the network devices utilizes a TDMA channel access method. The TDMA channel is divided to time slots that are packed into a multiframe cycle (the term "cyclic" indicates herein that a TDMA multiframe is repeated every T seconds). This periodic multiframe cycle comprises N=L+D slots, wherein L slots from the message are control slots, and the rest, D slots are used for data. In fact, the D slots contain sound data in digital form, which is compressed by vocoder 14 and packed within respective TDMA slots by processing unit 13.

As will be elaborated hereinafter, the MANET system of the invention comprises assignment of two additional ad-hoc key devices, as follows:

a. A "synchronizer" device whose main task is to distribute synchronization data to all the network devices. As will be further discussed hereinafter, the synchronizer may be replaced at any control slot, without losing synchronization by any of the devices within the system; and b. A "leader" device whose task is to distribute the structure of the network (as the leader is located within a central location at the network, its view of the entire network is the most reliable). By "publishing" it is meant, among others, disseminating its structure view using relays. The leader approves one or more of the devices to function as relays within the network and guide them how to disseminate the information. As will be elaborated later, all the devices within the network comprise an internal algorithm for calculating the leader device. As all the devices within the network operate on a substantially identical set of data with respect to the structure of the network (which is propagated throughout the network and received at the all the devices within period T), and with the same algorithm, while each of them separately calculate the identity of the leader once in a period T, all the devices in fact reach the same conclusion with respect to the leader (which may therefore optionally replaced once in period T, depending on the result of said calculations). In such a manner, the identity of the leader is optimized once every period T. The leader also resolves collision of voice data, when occurs, and in some cases it also assigns which data slot can be used by each device.

The duration of the cycle is designed such the within a period T the structure of the entire network will become clear to each and every device within the network. More specifically, each device within the network is informed each cycle T about:

a. The rest of the devices that are active within the network;

b. The neighbors for each device;

c. Indication with respect to whether each of the devices is capable of performing as a relay or not.
d. Indication with respect to whether each of the devices is the leader for the current cycle.
e. A plurality of synchronization data, that are introduced within a plurality of slots within the cycle having period T;
f. Optionally, assignment of specific slots for use by a specific device, and collision resolve instructions when two or more devices introduce data to a same data slot (meaning which device is allowed to introduce data to said slot, and which is rejected);
g. The data that are introduced by specific devices and optionally disseminated by the relays within specific data slots;
h. Publication of the structure of the network, as received from the leader device;

As noted above, having the above data which is propagated within period T to each and every device within the network, particularly the data with respect to the structure of the network, each device applies an independent algorithm within the device in order to determine which device within the network will be assigned as a relay and which of them is a leader device. As all the devices operate substantially with the same set of data (as propagated within period T), all the devices are expected to reach independently the same conclusion with respect to the new leader. In one preferable embodiment, the leader device is the device which is at the middle of the network, and which can propagate data to the devices at the edge of the system, while applying a minimal number of relays. In some cases, two or more devices can be determined as best candidates for performing as a leader. In such a case, the leader is selected from among said optimal candidates arbitrarily, for example, by pre-defining that the one with the highest serial number from among said candidates will be assigned as the leader.

EXAMPLE

In one specific embodiment shown in FIG. 3, the TDMA structure is a multiframe cycle of 200 slots having total duration of 150 ms. The TDMA multi frame cycle is divided into 5 frames, each having 40 slots, while each frame has a total duration of 30 ms. The 40 slots within each frame are divided into 10 control slots, while the rest of the 30 slots are used for data. The frames indicated as S are synchronization frames, as introduced to the cycle by the synchronizer device (for example, these slots are slots number 0, 40, . . . 160 of the cycle, or in fact slots 0 of each frame as indicated in FIG. 3). These synchronization slots enable the rest of the devices to synchronize their clock (i.e., the beginning of the cycle, frame, and particular slots) for reception of the following slots of the TDMA cycle. Moreover, in order to eliminate drift of the clock between receipt of each S slot, the devices also correct their synchronization upon their receipt of control slots (which are discussed hereinafter).

The slots that are indicated by a numeral indication (14, 13, 12, . . . 0) are control slots that are kept for each and every device respectively of the network (even potential ones) for informing the identities of their neighbors, optionally within one (or more) hop distance, and a fine synchronization data each device includes an indication of the device on which it synchronizes). As noted above, each frame also contains a main synchronization data 5, as provided from the synchronizer. As a result of this structure, the various devices are synchronized based on said main synchronization data, and also correct their synchronization upon receipt of each of said control slots, in order to eliminate drift of their clock.

The frames that are indicated by R are used for network structure dissemination by the relays. These slots are divided into N sub groups (not shown), where N is the maximum number of relays allowed. As the identities of the relays are not known in advance, said R slots are kept for all the relays, without assigning them to specific ones. Each relay picks randomly one sub group of R within each frame to transmit its own relay message. This technique reduces collision of data, because a relay message that was lost due to collision (or reception of undesired data) will be transmitted again in the next sub group. In fact, each relay accumulates in a buffer control messages of other relays with respect to the structure of the network that it receives, and it packs and transmits its own determined structural data, and said accumulated data within the R slots of the selected sub group. Said R message contains the list of 1-hop neighbors of this relay and said received messages from other relays that that contain their own 1-hop neighbors. This technique also helps to overcome loss of data, because of the redundant resending of each relay's data. The information from all relays is used by the received devices to build the full network structure (particularly by those devices that have not received the structural data, as transmitted by distant relays directly). As noted above. Each control slot (14, 13, . . . 0) and R slot also contains synchronization information. The various devices correct their synchronization upon receipt of each of said control or R slots, in order to eliminate drift.

The frames that are indicated by L are the leader messages. More specifically, the messages are used, among others, to distribute the structure of the network, to resolve collisions of data (i.e., introduction of sound data into a same data slot D by two or more devices, etc.) In a similar to the R and control slots, the L messages may also contain synchronization information.

The slots that are indicated by D include sound data that is introduced (after compression) by the vocoder 14. As shown, within each group of 5 consecutive D slots, the first slot has a bright, background, while the next 4 slots have a dark background. Preferably, only those slots with a bright background are used for initiator's sound data, while the four following data slots (i.e., those having dark background) are used for retransmitting the data by relays. This is done in order to assure proper propagation of the sound data also to distant devices, where the sound data must pass though one or more relay devices where the sound data must pass though one or more relay devices, i.e., be transmitted via "hopping". Therefore, there are only 6 D slots that are in use within each frame. As also noted before, said 6 slots may be used by up to 4 devices for carrying out the simultaneous conference discussion. Upon a need for the introduction of sound data, the device randomly selects one of the 6 available initiator D slots within the frame. Should there be instances where two devices select simultaneously an identical slot, the leader device resolves the collision, by either assigning the subject slot to one of the colliding devices (rejecting the other and requiring the latter to select another slot), or rejecting the use of this slot by either of said devices. In any case, during the 30 ms period of each frame, each device accumulates the respective data as included within the D slots, decodes and mixes them and plays this data via speakers 17 to the user.

To summarize, upon speaking into the microphone 15, the system converts the sound to digital signals by means of an A/D unit (not shown), while recognizing the fact that transmission of speech has commenced whereupon the latter is being transmitted and sent to the vocoder 14, who in turn compresses the digital signal, and feeds the compressed data into the respective D slots.

When used in a motorcycle device, the subject invention stipulates that upon one rider commencing speech, said optional voice activation detector (VAD) 19 detects the existence of voice and vocoder 14 begins compression and storage of the same. Thereupon, the processing unit attempts to identify an available data slot from among the six available slots. This is made possible in a rather seamless manner due to the fact that the processing units permanently monitor previous communications. Then, the device 10 transmits the compressed voice within the first available slot, which is kept for this device as long as the speech from this device continues.

As also noted above, the subject MANET of the invention further comprises definition of a "synchronizer" device. The synchronizer device synchronizes the TDMA messages and operation in all MANET participating devices, in order to overcome hardware, processing and signal propagation delays. Remote devices receive their synchronization via the one or more relays or neighboring devices, respectively. Each device within the network must be synchronized in order to properly adapt the TDMA operation. For example, each device will have information stored that indicates with respect to each slot when the slot begins, the number of the slot within the multiframe, the type of the slot, whether a specific data slot is a slot into which it is authorized to write, or just to "listen", etc. According to the invention at any given time there is one and only one synchronizer device. Moreover, in order to eliminate a possibility of drift in the synchronization at any device of the network (particularly those that receive the synchronization via a relay), the main synchronization messages S are sent by bursts of a high rate transmissions, i.e., multiple times within each TDMA cycle (among this high rate synchronization, fine tuning messages are included within each control slot and each R slot, respectively).

Since 100% reliable communication with the active synchronizer device cannot be guaranteed all times, the invention employs measures to resolve this imperfection, namely, by causing each device to comprise an algorithm for determining the identity of the present synchronizer. Upon loss of communication with the present synchronizer, this algorithm is applied by each device to reassign a new synchronizer. Thus, a new synchronizer device may be assigned once in each frame.

For example, according to an embodiment of the invention the synchronizer device is always the active device having the highest serial number. Whenever the communication with the synchronizer device is lost, each device verifies the serial numbers of its neighboring devices, and if subsequently it is found that one of these devices has the highest serial number, this specific device with the highest serial number becomes a candidate to assume the role of synchronizer. The data about the one or more candidates is propagated within the network, while eliminating those having a lower serial number, until one candidate device remains, and this device is then assigned as the new synchronizer device. The new synchronizer device begins its functionality as the synchronizer with the previous existing synchronization, in order to minimize synchronization difficulties during the transitional time. Furthermore, upon joining of any new device to the active network, a verification procedure is performed with respect to its serial number. If its serial number is found to be lower than the serial number of the existing synchronizer device, the current synchronizer remains. However, if the joining device has a higher serial number than the present synchronizer, this device synchronizes to the existing synchronizer and subsequently assigns operation as the new synchronizer. This technique is used in order to minimize synchronization problems during the transitional time of synchronizer replacement. It should be noted that the assignment of the synchronizer device to the one having the highest serial number is only one convenient example. Other algorithms for selection of the new synchronizer device may alternatively be used.

According to an embodiment of the invention, the synchronization data may optionally be propagated to some devices in the network in hops (i.e., via relays). For example in FIG. 1, assuming that device 40d is the synchronizer, device 40c is synchronized to device 40d while device 40c further publishes the synchronizing data within its own control slots. Device 40h receives said message from device 40c and uses this message to accept device 40d as the synchronizer. In such a manner, device 40h becomes synchronized to device 40d.

The Example above assumes a 150 ms period for the TDMA cycle T. This example, however, should not be viewed as a limitation, as the duration T may typically be selected to be from 90 ms to 2 seconds, in order to assure the ability of the network to adapt and adjust itself to the fast changing environment. As described above, the structure of the network in terms of the leader and the relays is updated every period T. Following each of said updates, one or more of the leader L and relays R of the network may be replaced. Moreover, the synchronizer may be replaced at a rate even higher than the period T (in fact any time within the frame). In such a manner, the network structure, as well as its operation, is well adapted to the fast changing environment (which exists, for example, when pluralities of devices are used by constantly moving motorcyclists who are also changing their respective positions in the group, for carrying out full-duplex, conference call conversations among the participants. It should also be noted that the fact that the algorithm for recalculating the leader, synchronizer, and relays is distributed and exists in each of the devices and that all the network devices operate substantially on a same set of data with respect to the structure of the network adds to the flexibility and robustness of the network, as in fact the network does not depend on the existence of any particular participating device, and it can seamlessly overcome any loss of communication with any of the network devices. Furthermore, the repeated update of the MANET of the invention is of high importance, as this update is performed even at times when the voice communication is inactive. This fact assures that upon initiation of voice, the network structure is optimized and is ready to satisfy the full duplex, conference call requirements.

According to an embodiment of the invention one or more of the devices may act as an interconnection router. In the case that the user wishes to add to the conference call a remote user which is not a part of the MANET, he may use its IR module for this purpose (see FIG. 1). In such a case, the device 40f will connect the remote device 40j using its internal WAN/LAN or cellular module 22 (see FIG. 2) or by connecting to an external WAN/LAN or cellular module via the Bluetooth module 21. The audio input from the remote device will be a trigger for data sending similar to VAD 19 triggering. If the user of the remote device 40j and the user of the IR device 40*f* talk at the same time, the IR device 40*f* will mix said two voice inputs and then transmit the MANET communication.

In still another embodiment of the invention, one or more devices may be assigned an IR role automatically. In a case where the MANET connection between two devices is dropped (for example, due to interference or RSSI below a threshold level), an edge device at the MANET may reconnect the remote device (with whom the connection was dropped), via an alternative WAN/LAN/Cellular communication. This procedure may be performed automatically using a set of thresholds and timers that reconsider and update the network architecture.

In still another embodiment of the invention, one or more WAN/LAN/Cellular devices may be assigned as an IR device automatically. In a case where the LAN/WAN/Cellular connection is disconnected due to a coverage reason, those devices that are disconnected may resume connection to the WAN/LAN/Cellular network via the MANET, while using one of the device as an IR. This procedure may be performed automatically using a set of thresholds and timers that reconsider and update the network architecture.

All the above described manners for interconnecting between the MANET devices and devices of external networks enable respectively the expansion of the geographical coverage of both the MANET and the external network.

The description above has been provided particularly with respect to voice communication. It should be noted, however, that the MANET of the invention may also be used for data or video communication.

It should also be noted that although the voice data from the plurality of the riders/users is not transmitted simultaneously, but each device transmits within its respective slots, the full duplex experience is maintained in view of the high rate of the transmission, the propagation of the data within the network, and combination of the transmitted data at the receiving devices.

While some embodiments of the invention were described by way of illustration, it will be apparent that the invention can be carried into practice with a wide variety of circumstances and modifications, and with the use of numerous equivalents or alternative solutions that are within the scope of persons skilled in the art, without departing from the spirit of the invention or exceeding the scope of the claims. For illustration purposes it may be stated that said invention may be equally useful and innovative in any setting of multiple users who are constantly in motion and who require the freedom of changing their respective position in the subject group, e.g. construction or oil-rig workers, field personnel on archeological sites, security and military personnel etc.

The invention claimed is:

1. A method for forming a mobile ad-hoc voice network for operation in a rapidly changing environment, comprising:

assigning to a plurality of devices a group ID and to each of said devices a respective identity being a serial number;

performing, for each of a plurality of TDMA cycles, the steps of:

transmitting, by each of said devices within control slots of said TDMA cycle, structural data which has been calculated by said device, wherein structural data includes information about the structure of the network as received by said device and comprises:

the identities of active devices within the network and, for each device, the identities of devices located in their respective vicinities, and the identity of one or more of said devices which are capable of serving as relay devices, wherein relay devices collect structural data transmitted from their respective neighboring devices and re-send said structural data within control relay slots of said TDMA cycle, and the identity of one of said devices which serves as a leader of said network, wherein said leader collects structural data transmitted from its respective neighboring devices, and propagates said structural data within control leader slots of said TDMA cycle; and transmitting, by a particular one of said devices serving as a synchronizer of said network within synchronization slots of the TDMA cycle, periodical synchronization data, and propagating the periodical synchronization data to all the devices via its neighboring devices;

synchronizing, by each of the devices within said TDMA cycle, its timing with said synchronizer based an said periodical synchronization data, and upon determining that periodical synchronization data from the synchronizer is missing, determining by each device a new synchronizer for the network; and sending, by particular devices serving as initiator devices of said network within a plurality of data slots, voice data in digital form, and applying, upon completion of said TDMA cycle, an algorithm independently by each of said devices, wherein said algorithm comprises:

calculating, based an individual structural data transmitted by each of the devices within said control slots, said control relay slots and said control leader slots of said TDMA cycle, structural data for the next TDMA cycle, wherein the identity of a leader for the network is calculated based on a criterion of centrality within the network, wherein the leader is calculated as a device located at a central location within the network structure, such that the number of relay devices required by the leader to propagate data to devices at the edge of the network is minimal; and calculating the identity of a synchronizer for the network.

2. Method according to claim 1, wherein the TDMA cycle duration is between 90 ms to 2 seconds.

3. Method according to claim 1, wherein the voice data which is introduced within said data slots is voice data which is compressed within the respective initiator device by a vocoder, wherein the number of data slots available in a TDMA cycle for voice data from initiator devices is such that voice data is introduced simultaneously by any of up to 4 initiator devices within respective of said TDMA slots.

4. Method according to claim 3, wherein a decoder within each device decodes and sounds to a user said compressed voice data via respective speakers.

5. Method according to claim 1, wherein the voice data is propagated within said slots of said TDMA cycles to all the devices within the network, either directly within said data slots or by one or more of the relay devices within data relay slots within said TDMA cycle.

6. Method according to claim 1, wherein said structural data is propagated within said TDMA cycle within predefined control slots and within control leader slots and control relay slots respectively, enabling each device to determine independently the structure of the entire network.

7. Method according to claim 1, wherein said synchronization data from the synchronizer is conveyed within predefined synchronization slots within the TDMA cycle, such that the TDMA cycle is comprised of a predefined number of frames and each of said synchronization slots is positioned within a respective frame, and wherein additional synchronization data is provided by each respective device at each control slot at the TDMA cycle, wherein each of the devices of the network use said additional synchronization data to synchronize and fine tune their own synchronization.

8. Method according to claim 1, wherein upon said determination that synchronization data from the synchronizer is missing, each device determines a new synchronizer such that the newly determined synchronizer is the device having the highest serial number from the group of remaining devices.

9. Method according to claim 7, wherein additional synchronization data distribution is provided by each respective device at each control slot at the TDMA cycle, while devices of the network use said additional synchronization data to synchronize and fine tune their own synchronization.

10. Method according to claim 8, wherein each newly determined synchronizer first applies the previous existing synchronization data from the current synchronizer before generating its own synchronization.

11. Method according to claim 1, wherein said leader is used to optimally propagate the network structural data and collision resolution data, and, when two or more devices are determined by a particular device to be equally qualified for serving as a leader, the one meeting a predefined criterion among them is selected by said particular device to serve as the leader.

12. Method according to claim 11, wherein said criterion is the device having the largest serial number among those that are found to be equally qualified for serving as a leader.

13. Method according to claim 1, wherein the mobile ad-hoc voice network is utilized for users such as motorcyclists or industrial/professional operators, wherein each device further comprises a voice activation detector determining voice initiation by the user.

14. Method according to claim 1, further comprising performing the step of assigning a group ID and device serial number to each device is one of said devices which serves as a head device.

15. Method according to claim 1, wherein one or more of the participant devices in said ad-hoc voice network uses a LAN/WAN/Cellular module to interconnect between devices within said ad-hoc network and remote devices of an external network.

16. Method according to claim 1, wherein said one or more devices that use their LAN/WAN/Cellular for the purpose of said interconnection are assigned either manually to perform this task or assigned automatically and dynamically to perform this task during the operation of said ad-hoc network.

17. Method according to claim 1, wherein, in every TDMA cycle, each device calculates and determines independently its possible role as a leader, synchronizer, or relay.

18. Method according to claim 1, wherein each initiator device selects on its own a data time slot within the TDMA cycle, while possible data collisions of selecting a same time slot by more than one device are resolved by the leader device.

* * * * *